United States Patent
Giridhar et al.

(10) Patent No.: US 9,338,038 B2
(45) Date of Patent: May 10, 2016

(54) INTERFERENCE CANCELLING BLOCK MODULATION

(76) Inventors: Krishnamurthy Giridhar, Chennai (IN); Vinoth Nagarajan, Chennai (IN); Ayyar Arun Balavenkatasubramanian, Salem (IN); Bhaskar Ramamurthi, Chennai (IN); Devar Sendilramkumar S, Ahmedabad (IN); Ganesh V., Chennai (IN); Kuchi Kiran Kumar, Chennai (IN)

( * ) Notice: Subject to any disclaimer, the term of this patent is extended or adjusted under 35 U.S.C. 154(b) by 0 days.

(21) Appl. No.: 13/640,036

(22) PCT Filed: Apr. 11, 2011

(86) PCT No.: PCT/IN2011/000025
§ 371 (c)(1),
(2), (4) Date: Oct. 8, 2012

(87) PCT Pub. No.: WO2011/125076
PCT Pub. Date: Oct. 13, 2011

(65) Prior Publication Data
US 2013/0101062 A1    Apr. 25, 2013

(30) Foreign Application Priority Data
Apr. 9, 2010 (IN) .............................. 995/CHE/2010

(51) Int. Cl.
*H04B 7/04* (2006.01)
*H04L 25/03* (2006.01)
*H04B 7/06* (2006.01)
*H04L 5/00* (2006.01)

(52) U.S. Cl.
CPC ........ *H04L 25/03331* (2013.01); *H04B 7/0417* (2013.01); *H04B 7/063* (2013.01); *H04L 5/0023* (2013.01); *H04L 2025/03426* (2013.01)

(58) Field of Classification Search
CPC ...... H04B 7/0408; H04B 7/0413; H04B 7/02; H04B 7/04; H04B 7/0404; H04B 7/0456; H04B 7/0613; H04B 7/063; H04L 25/03331; H04L 25/03305; H04L 25/03312; H04L 25/03318
USPC ......... 375/295, 316, 259, 260, 219, 220, 285, 375/267, 296, 299, 346, 347, 349
See application file for complete search history.

(56) References Cited

U.S. PATENT DOCUMENTS

| | | | |
|---|---|---|---|
| 8,862,070 B2* | 10/2014 | Kim ....................... | H04W 4/20 370/203 |
| 2008/0260058 A1* | 10/2008 | Li ............................... | 375/260 |
| 2009/0074093 A1* | 3/2009 | Han et al. ..................... | 375/260 |
| 2009/0215480 A1* | 8/2009 | Kim ....................... | H04B 7/024 455/501 |
| 2010/0157924 A1* | 6/2010 | Prasad et al. ................ | 370/329 |
| 2010/0232535 A1* | 9/2010 | Yue et al. ..................... | 375/267 |
| 2011/0059705 A1* | 3/2011 | Tajer et al. ................ | 455/114.3 |
| 2011/0176633 A1* | 7/2011 | Ojard et al. ................... | 375/295 |
| 2012/0099540 A1* | 4/2012 | Doppler et al. ............... | 370/329 |

\* cited by examiner

*Primary Examiner* — Siu Lee

(57) ABSTRACT

Embodiments herein disclose an Interference Cancelling Block Modulation (ICBM), a new open-loop precoding scheme where each transmitter is assigned with a predetermined precoder which facilitates interference cancellation at the receivers. Only a finite set of precoders will be used, and they will be assigned to each transmitter in a pre-determined manner. Usually, interfering transmitters located adjacent to each other will have different precoders, and the same precoder can be reused by non-adjacent transmitters. The precoders are represented by N×K matrices and they expand the symbols in time and/or frequency by a factor of N/K while providing precoded sequences with low cross-correlation properties.

15 Claims, 5 Drawing Sheets

INTERFERENCE CANCELLING BLOCK MODULATION

The present application is based on, and claims priority from, IN Application Number, 995/CHE/2010 filed on 9 Apr. 2010, the disclosure of which is hereby incorporated by reference herein.

TECHNICAL FIELD

This embodiments relates to wireless communication techniques, and more particularly to interference mitigation in wireless communication techniques.

BACKGROUND

Co-channel interference has been one of the major factors limiting the performance of systems reusing the spectrum. The techniques optimized for the stand alone single-cell case fail to deliver their gains in the presence of interference. This makes interference mitigation techniques, an essential aspect of systems employing spectral reuse.

Users, who are in the cell-edge region receive transmissions of multiple transmitters, hence they experience significant interference in a reuse-1 scenario

SUMMARY

Embodiments herein disclose a method for enabling communications in a communication network, the method comprising of a transmitter coding an input stream with a precoder matrix, wherein the transmitter has been assigned the precoder matrix; the transmitter transmitting the coded input stream to a receiver; and the receiver detecting the coded input stream using precoder matrices of all transmitters present in the network. The unique precoder matrix may have static values or dynamic values, which may be assigned by a controller in the network to the transmitter or assigned the precoder matrix at the time of manufacture of the transmitter. The precoder matrix depends on a plurality of factors, the factors comprising number of free eigen directions; number of common eigen directions; and number of users in the network. The transmitter flattens the coded input stream before transmission. The receiver determines precoder matrices of all other transmitters using precoder matrix of the transmitter and groups the coded input stream into a vector, before detecting the coded input stream.

Also, disclosed herein is a communication network comprising a transmitter adapted for coding an input stream with a precoder matrix, wherein the transmitter has been assigned the precoder matrix; and transmitting the coded input stream to a receiver; and a receiver adapted for detecting the coded input stream using precoder matrices of all transmitters present in the network. The transmitter is adapted for flattening the coded input stream before transmission. The receiver is adapted for determining precoder matrices of all other transmitters using precoder matrix of the transmitter and for grouping the coded input stream into a vector, before detecting the coded input stream.

Disclosed herein is a transmitter in a communication network adapted for coding an input stream with a precoder matrix, wherein the transmitter has been assigned the precoder matrix; and transmitting the coded input stream to a receiver. The transmitter is adapted for flattening the coded input stream before transmission.

Disclosed herein is a receiver in a communication network adapted for detecting a received stream using precoder matrices of all transmitters preset in the network. The receiver is adapted for determining precoder matrices of all other transmitters using precoder matrix of the transmitter and for grouping the coded input stream into a vector, before detecting the coded input stream.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE FIGURES

This embodiments is illustrated in the accompanying drawings, through out which like reference letters indicate corresponding parts in the various figures. The embodiments herein will be better understood from the following description with reference to the drawings, in which.

DETAILED DESCRIPTION OF EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Embodiments herein disclose an Interference Cancelling Block Modulation (ICBM), a new open-loop interference mitigation scheme where each transmitter is assigned with a predetermined precoder matrix. Only a finite set of matrices need to be used. They will be assigned to each transmitter in a pre-determined manner Usually, interfering transmitters located adjacent to each other will be assigned different matrices, and the same matrix can be reused by non-adjacent transmitters. Each of the matrices used by the transmitters is an N×K matrix, known as the ICBM matrix. The matrices expand the symbols which are mapped in time and/or frequency by a factor of N/K while providing precoded sequences with low cross-correlation properties.

Figure 1:
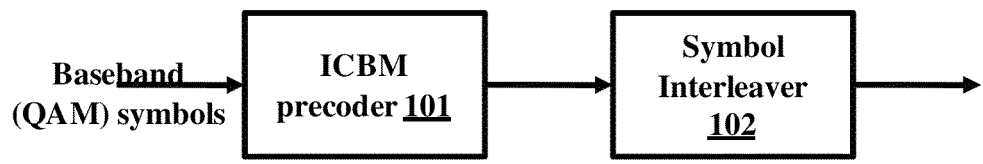
FIG. 1 depicts a transmitter, according to embodiments as disclosed herein.

FIG. 1 depicts a transmitter, according to embodiments as disclosed herein. The transmitter comprises of an ICBM precoder 101 and a symbol interleaver 102. The ICBM precoder is designed for a specific Signal to Interference Ratio (SIR) and number of users in the network m. There are two parameters-number of free eigen directions ($k_1$) and number of common eigen directions ($k_2$). Both these parameters depend on the SIR. $K=k_1+k_2$ and $N=mk_1+k_2$. The ICBM precoder 101 may have the values of K and N stored within it. The values of K and N may be sent to the ICBM precoder 101 by a controller present within the network. The values of K and N may be coded into the transmitter at the time of manufacture of the transmitter. The values of K and N may be static. In another embodiment herein, the values of K and N may be dynamic. The ICBM precoder 101 linearly maps a set of K baseband symbols to N baseband symbols. This implies that the ICBM precoder 101 expands the resources by a factor of N/K. The output of this rate K/N ICBM precoder 101 comprises of N complex symbols, where each of these symbols is a linear combination of the K input M-ary QAM symbols. A properly chosen symbol interleaver 102 ensures that the channel seen by the N symbols at the output of the ICBM precoder is flat. In another embodiment herein, the symbol interleaver 102 may be absent in the transmitter.

Figure 2:
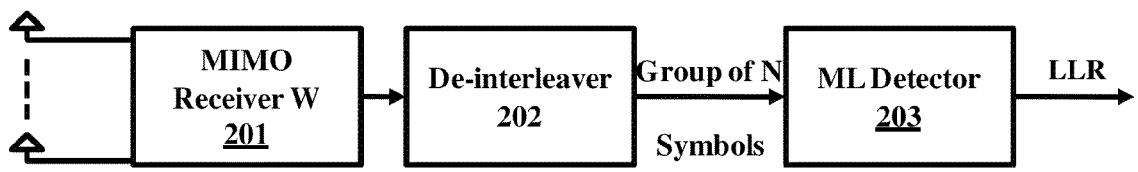
FIG. 2 depicts a receiver, according to embodiments as disclosed herein.

FIG. 2 depicts a receiver, according to embodiments as disclosed herein. The receiver comprises of a Multiple Input, Multiple Output (MIMO) receiver 201, a de-interleaver 202 and a Maximum Likelihood (ML) Detector 203. The MIMO receiver 201 receives the input using at least one antenna and sends the received signals to the de-interleaver 202. The de-interleaver 202 groups the N symbols that were interleaved at the transmitter into a single vector. The ML detector 203 jointly detects the K symbols that were transmitted using the known ICBM matrices associated with all the transmitters in the network. The ML detector 203 may become aware of the ICBM matrix of the transmitter from the control signal sent by the transmitter while initiating the transmission. The ICBM matrices of the other transmitters for a given rate can be generated at the receiver, since only the position of the rows containing zeros varies in all the matrices. The receiver equations are given as follows:

Consider the following received signal model for a cell-edge UE over the four ICBM modulated symbols that is, over the 2×2 time-frequency grid shown in FIG. 2. Let the number of receive antennas be $N_r$. Therefore, we have, $$y_i = H_{ii}Q_i x_i + \sum_{\substack{j=1 \\ j \neq i}}^{M} H_{ij}Q_j x_j + n_i$$

where, $y_i$ is the (4 $N_r$)×1 received symbol vector obtained by stacking up the symbols received in the $N_r$ receive antennas at the four instants, $H_{ij}$ is the (4 $N_r$)×4 band-diagonal channel matrix over the four resource elements, $Q_j$ is the ICBM precoder used by transmitter$_j$, $x_j$ is the 2×1 baseband QAM symbol vector that was modulated by the ICBM precoder and $n_i$ is the (4 $N_r$)×1 additive white Gaussian noise vector at UE$_i$. The receiver has an MRC front-end. The ICBM demodulator stacks up the symbols received in the $N_r$ receive antennas from the four REs containing the ICBM modulated symbols. It performs MRC by multiplying the received symbol vector with $(H_{ii})^H$. This leads to the following equation.

$$\hat{y}_i = (H_{ii})^H y_i$$
$$= (H_{ii})^H H_{ii} Q_i x_i + \sum_{\substack{j=1 \\ j \neq i}}^{M} (H_{ii})^H H_{ij} Q_j x_j + (H_{ii})^H n_i$$

where, $\hat{y}_i$ is 4×1 vector. The ICBM demodulator takes $\hat{y}_i$ as its input and evaluates LLRs jointly for the two baseband QAM symbols in $x_i$. The LLR expression for the $m^{th}$ bit is given as follows.

$$LLR_m = \log \left( \frac{\sum_{x \in S_{v,m}} \exp\left[-\frac{(\hat{y} - H_{ii}^H H_{ii} Q_i x)^H R_i^{-1} (\hat{y} - H_{ii}^H H_{ii} Q_i x)}{2}\right]}{\sum_{x \in S_{s,m}} \exp\left[-\frac{(\hat{y} - H_{ii}^H H_{ii} Q_i x)^H R_i^{-1} (\hat{y} - H_{ii}^H H_{ii} Q_i x)}{2}\right]} \right)$$

where, $S_{0,m}$ and $S_{1,m}$ represent sets of all $\{x_i\}$ with 0 and 1, respectively in the $m^{th}$ bit position. The covariance matrix $R_i$ evaluated by UE$_i$ for computing the LLRs is given by, $$R_i = \sum_{\substack{j=1 \\ j \neq i}}^{M} (H_{ii}^H H_{ij}) Q_j Q_j^H (H_{ii}^H H_{ij})^H + \sigma^2 I$$

where, I is 4×4 identity matrix and $\sigma^2$ is the variance of thermal noise after MRC equalization.

In another embodiment herein, the de-interleaver 202 may be absent in the receiver.

Figure 3:
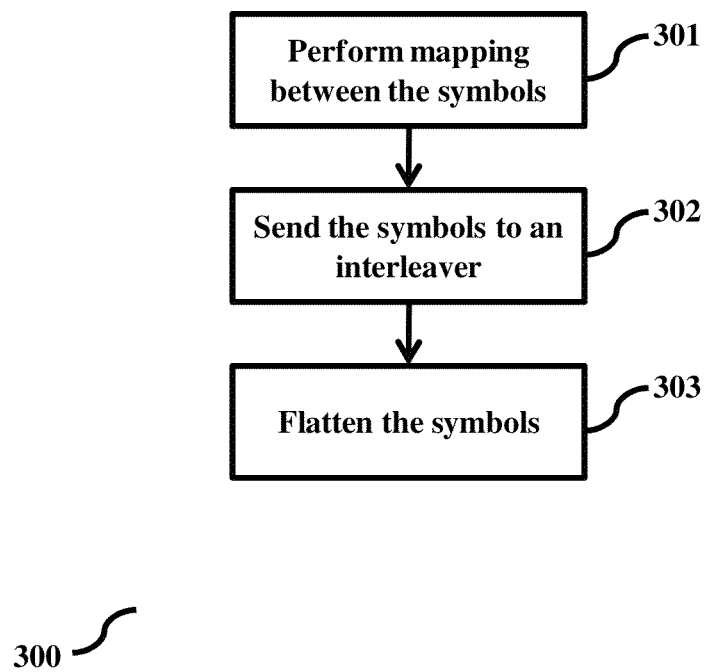
FIG. 3 depicts the process at a transmitter, according to embodiments as disclosed herein.

FIG. 3 depicts the process at a transmitter, according to embodiments as disclosed herein. The ICBM precoder 101 linearly maps (301) a set of K baseband symbols to N baseband symbols. By mapping the symbols, the ICBM precoder 101 expands the resources by a factor of N/K. The ICBM precoder 101 sends (302) the symbols to the interleaver 102. The symbols sent to the interleaver 102 comprises of N complex symbols, where each of these symbols is a linear combination of the K input M-ary QAM symbols. The interleaver 102 flattens (304) the symbols. The interleaver 102 may flatten the symbols by mapping the symbols to resources elements which are close-enough in time domain and/or frequency domain. The various actions in method 300 may be performed in the order presented, in a different order or simultaneously. Further, in some embodiments, some actions listed in FIG. 3 may be omitted.

Figure 4:
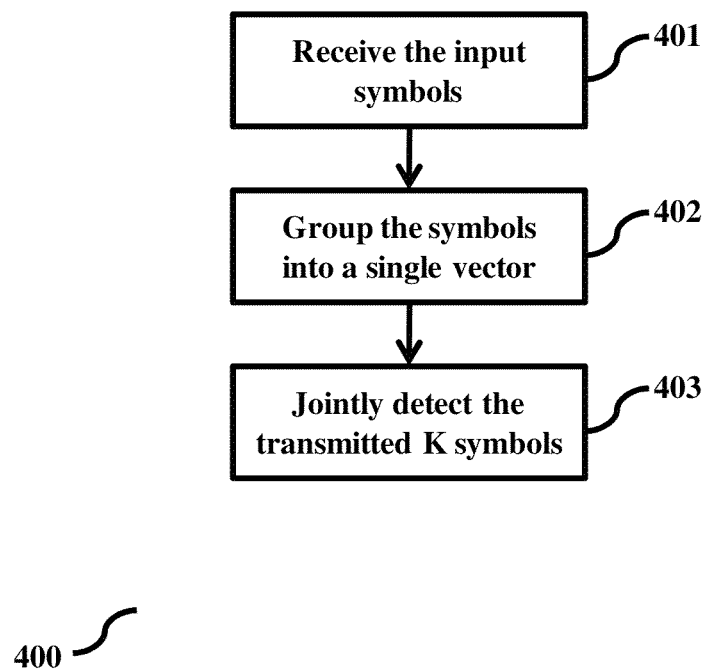
FIG. 4 depicts the process at a receiver, according to embodiments as disclosed herein.

FIG. 4 depicts the process at a receiver, according to embodiments as disclosed herein. The de-interleaver 202 receives (401) the N symbols from the MIMO receiver 201. The de-interleaver 202 groups (402) the received N symbols into a single vector. The de-interleaver 202 passes the vector to a ML detector 203. The ML detector 203 jointly detects (403) the K symbols that were transmitted using the ICBM matrices associated with the network. The various actions in method 400 may be performed in the order presented, in a different order or simultaneously. Further, in some embodiments, some actions listed in FIG. 4 may be omitted.

Consider an example where K=2 and N=4, hereby providing an ICBM scheme, with a rate of K/N=2/4. Here $k_1$=1 and $k_2$=1 and m=3. There are three matrices $Q_1$, $Q_2$ and $Q_3$ are defined as follows:

$$Q_1 = \begin{bmatrix} 1.09128 & -0.55595 \\ 0 & 0 \\ 0 & 0 \\ 0.32098 & 0.63006 \end{bmatrix}$$

$$Q_2 = \begin{bmatrix} 0 & 0 \\ 1.09128 & -0.55595 \\ 0 & 0 \\ 0.352098 & 0.63006 \end{bmatrix}$$

$$Q_3 = \begin{bmatrix} 0 & 0 \\ 0 & 0 \\ 1.09128 & -0.55595 \\ 0.32098 & 0.63006 \end{bmatrix}$$

For $k_1=2$, $k_2=1$ and $m=2$. $K=3$, $N=5$, the two matrices $Q_1$ and $Q_2$ are given as:

$$Q_1 = \begin{bmatrix} 0.7298 & -0.4963 & 0.6488 \\ -0.6238 & -0.9003 & 0.0129 \\ 0 & 0 & 0 \\ 0 & 0 & 0 \\ 0.3729 & -0.2673 & -0.6240 \end{bmatrix}$$

$$Q_2 = \begin{bmatrix} 0 & 0 & 0 \\ 0 & 0 & 0 \\ 0.7298 & -0.4963 & 0.6488 \\ -0.6238 & -0.9003 & 0.0129 \\ 0.3729 & -0.2673 & -0.6240 \end{bmatrix}$$

In the case of the Long Term Evolution (LTE) standards, each $i^{th}$ base station is assigned with one of the above-mentioned precoders $Q_1$ from the above-mentioned precoders. This is done similar to the assignment of offsets for Channel state Information—Reference Symbols (CSI-RS) to the base stations. While the offset assignment is done with modulo 6 on the cell-ids, the precoder assignment for ICBM is done with modulo 3. This ensures that most of the interference seen by a UE using a certain ICBM precoder matrix 101 is from base stations with a different ICBM precoder matrix 101.

Figure 5:
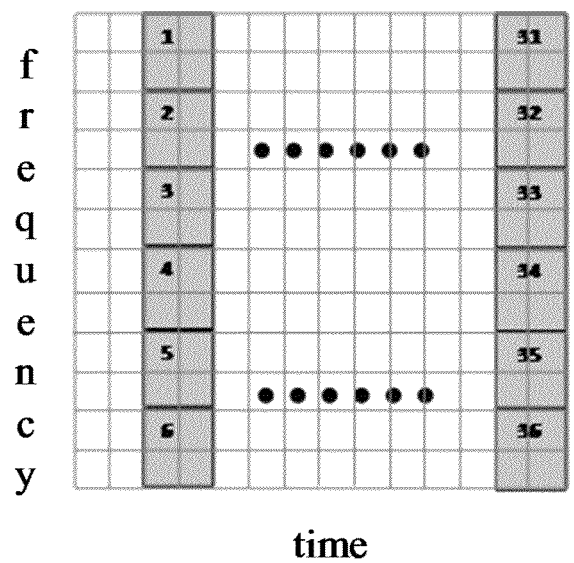
FIG. 5 illustrates the mapping of the ICBM symbols in frequency-time grid, according to embodiments as disclosed herein.

The symbol interleaver 102 ensures that the 4 symbols at the output of the ICBM 101 gets mapped to resources elements which are close-enough in time domain and/or frequency domain. As a result, the channel seen by the four symbols is flat. Since the mapping of symbols to LTE/LTE-A resource elements is done frequency-first, the interleaver 102 maps a set of four ICBM symbols to time-frequency grid as shown in FIG. 5, where $\{1, 2, \ldots, 36\}$ denote ICBM symbol indices.

Embodiments herein disclose an open-loop post-modulation technique, requiring minimum coordination among the various interfering transmitters. Embodiments herein disclose a method to generate a set of matrices to be distributed across multiple interfering transmitters employing ICBM. Embodiments herein disclosed improve the spectral efficiency of interference-limited users by dynamic or static co-operation between interfering transmitters. Embodiments herein disclose an alternate method to cancel/minimize interference when the number of interferers is greater than the number of antennas at the receiver. Embodiments herein disclosed can be designed for different rates depending on the number of interferers to be suppressed or any other performance metric rate that is limited by instantaneous or statistical interference profiles. Embodiments herein disclose can be configured between different transmitters such as macro-cellular base-stations, relays, micro/pico base-stations and/or femtocells to minimize interference across their individual coverage region. Hence the spectral efficiency of the system increases. Embodiments herein disclose can also be used on mobile transmitters on the uplink. Multiple mobile terminals can be scheduled to transmit simultaneously on the same resource (time and frequency) by employing enabling ICBM with a well designed precoder matrix.

Embodiments herein may be employed irrespective of the number of antennas at the transmitter and receiver. ICBM may be considered as a symbol-level encoder for interference cancellation and the rate K/N can be varied depending on the number of interferers or the throughput that is desired.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:

1. A method for enabling communications in a communication network, said method comprising of:
   coding an input stream with a precoder matrix by a transmitter, wherein said transmitter has been assigned said precoder matrix and wherein said transmitter rearranges said coded input stream before transmission;
   transmitting said coded input stream to a receiver by said transmitter; and
   detecting said coded input stream using precoder matrices of all transmitters present in said network by said receiver, wherein said receiver determines said precoder matrices of all other said transmitters using said precoder matrix of said transmitter.

2. The method, as claimed in claim 1, wherein said precoder matrix has static values.

3. The method, as claimed in claim 1, wherein said precoder matrix has dynamic values.

4. The method, as claimed in claim 1, wherein a controller in said network assigns said precoder matrix to said transmitter.

5. The method, as claimed in claim 1, wherein said precoder matrix depends on a plurality of factors, said factors comprising:
   number of free eigen directions;
   values of K and N;
   number of common eigen directions; and
   number of users using common resources in said network.

6. The method, as claimed in claim 1, wherein said precoder matrix is unique to said transmitter.

7. The method, as claimed in claim 1, wherein said receiver groups said coded input stream into a vector, before detecting said coded input stream.

8. The method, as claimed in claim 1, wherein said precoder matrices are predetermined by said network for a set rate K/N.

9. The method, as claimed in claim 1, wherein assigned said precoder matrix is predetermined by said network.

10. A communication network comprising:
a transmitter adapted for:
coding an input stream with a precoder matrix, wherein said transmitter has been assigned said precoder matrix;
rearranging said coded input stream before transmission; and
transmitting said coded input stream to a receiver; and
said receiver adapted for:
detecting said coded input stream using precoder matrices of all transmitters present in said network; and
determining said precoder matrices of all other said transmitters using said precoder matrix of said transmitter.

11. The network, as claimed in claim 10, wherein said receiver adapted for grouping said coded input stream into a vector, before detecting said coded input stream.

12. The network, as claimed in claim 10, wherein said precoder matrices are predetermined by said network for a set rate K/N.

13. The network, as claimed in claim 10, wherein assigned said precoder matrix is predetermined by said network.

14. A transmitter in a communication network comprising:
an Interference Cancelling Block Modulation (ICBM) precoder unit adapted for:
receiving values of K and N from a controller present in said communication network,
receiving a predetermined precoder matrix assigned by said communication network;
performing linear mapping of a set of K baseband symbols to a set of N baseband symbols; and
an interleaver adapted for:
rearranging said set of N baseband symbols before transmission.

15. A receiver in a communication network comprising:
a de-interleaver adapted for:
grouping a set of N symbols into a vector: and
maximum likelihood (ML) detector adapted for:
detecting K baseband symbols in a received set of N symbols from said de-interleaver using a set of Interference Cancelling Block Modulation (ICBM) precoder matrices of all plurality of transmitters present in said network.

* * * * *